US008437286B2

(12) United States Patent
Cai et al.

(10) Patent No.: US 8,437,286 B2
(45) Date of Patent: May 7, 2013

(54) SIGNALING FOR MULTI-HOP RELAY IN WIRELESS COMMUNICATION SYSTEMS

(75) Inventors: Sean Cai, San Diego, CA (US); Hongyun Qu, Guangdong (CN)

(73) Assignee: ZTE (USA) Inc., Morristown, NJ (US)

( * ) Notice: Subject to any disclaimer, the term of this patent is extended or adjusted under 35 U.S.C. 154(b) by 1161 days.

(21) Appl. No.: 12/036,199

(22) Filed: Feb. 22, 2008

(65) Prior Publication Data
US 2008/0267110 A1    Oct. 30, 2008

Related U.S. Application Data

(60) Provisional application No. 60/891,212, filed on Feb. 22, 2007.

(51) Int. Cl.
H04B 7/14    (2006.01)
(52) U.S. Cl.
USPC ............ 370/315; 370/310; 370/328; 370/338
(58) Field of Classification Search .................. 370/310, 370/315
See application file for complete search history.

(56) References Cited

U.S. PATENT DOCUMENTS

| 2001/0036810 | A1  | 11/2001 | Larsen |
|---|---|---|---|
| 2002/0075941 | A1  | 6/2002 | Souissi et al. |
| 2006/0040666 | A1* | 2/2006 | Narasimha et al. ............ 455/436 |
| 2007/0054689 | A1* | 3/2007 | Baker et al. ................... 455/522 |
| 2007/0072604 | A1  | 3/2007 | Wang |
| 2007/0076651 | A1* | 4/2007 | Chheda et al. ................ 370/328 |
| 2007/0086370 | A1  | 4/2007 | Jang et al. |
| 2007/0086374 | A1  | 4/2007 | Jang et al. |
| 2007/0086404 | A1  | 4/2007 | Jang et al. |
| 2007/0086413 | A1  | 4/2007 | Jang et al. |
| 2007/0086414 | A1  | 4/2007 | Jang et al. |
| 2007/0086415 | A1  | 4/2007 | Jang et al. |
| 2007/0086416 | A1  | 4/2007 | Jang et al. |
| 2007/0086417 | A1  | 4/2007 | Jang et al. |
| 2007/0086418 | A1  | 4/2007 | Jang et al. |
| 2007/0086419 | A1  | 4/2007 | Jang et al. |
| 2007/0087724 | A1  | 4/2007 | Jang et al. |
| 2007/0097984 | A1  | 5/2007 | Jang et al. |
| 2007/0115970 | A1  | 5/2007 | Jang et al. |

(Continued)

FOREIGN PATENT DOCUMENTS

| JP | 2006246002 A | 9/2006 |
|---|---|---|
| KR | 10-2006/0097693 | 9/2006 |
| WO | WO2008036784 A3 | 12/2008 |
| WO | WO2009009511 A9 | 4/2009 |

OTHER PUBLICATIONS

IEEE 802.16j Standard, "IEEE Standard for Local and Metropolitan Area Networks, Part 16: Air Interface for Fixed and Mobile Broadband Wireless Access Systems," Feb. 9, 2007, 58 pages.

(Continued)

Primary Examiner — Michael J Moore, Jr.
Assistant Examiner — Gautam Sharma
(74) Attorney, Agent, or Firm — Perkins Coie LLP

(57) ABSTRACT

Systems and techniques for signaling between a subordinate base station and a superordinate base station in a wireless network with wireless relay stations to inform the superordinate base station of a failure in establishing an uplink related to the subordinate base station and scheduling wireless resource allocation between a base station and one or more relay stations.

36 Claims, 6 Drawing Sheets

U.S. PATENT DOCUMENTS

| | | | |
|---|---|---|---|
| 2007/0115971 | A1 | 5/2007 | Jang et al. |
| 2007/0115972 | A1 | 5/2007 | Jang et al. |
| 2008/0025280 | A1 | 1/2008 | Hsu et al. |
| 2008/0070582 | A1 | 3/2008 | Cai |
| 2008/0101280 | A1* | 5/2008 | Gholmieh et al. ............ 370/328 |
| 2008/0108369 | A1* | 5/2008 | Visotsky et al. ............. 455/455 |
| 2008/0188231 | A1* | 8/2008 | Zhu et al. ...................... 455/450 |
| 2009/0016290 | A1 | 1/2009 | Chion et al. |
| 2009/0073916 | A1* | 3/2009 | Zhang et al. .................. 370/315 |
| 2009/0209199 | A1* | 8/2009 | Suga ................................. 455/7 |

OTHER PUBLICATIONS

IEEE 802.16-2004 Standard, "IEEE Standard for Local and Metropolitan Area Networks, Part 16: Air Interface for Fixed Broadband Wireless Access Systems," Oct. 1, 2004, 895 pages.

IEEE 802.16e-2005 Standard, "IEEE Standard for Fixed and Mobile Broadband Wireless Access Systems, Part 16: Air Interface for Fixed and Mobile Broadband Wireless Access Systems and Amendment 2: Physical and Medium Access Control Layers for Combined Fixed and Mobile Operation in Licensed Bands and Corrigendum 1," Feb. 18, 2006, 864 pages.

"Air Interface for Fixed and Mobile Broadband Wireless Access Systems—Multihop Relay Specification," IEEE 802.16j—06/026r4, (Jun. 6, 2007), 203 pages.

Draft Amendment to IEEE Standard for Local and metropolitan area networks; Part 16: Air Interface for Fixed and Mobile Broadband Wireless Access Systems; Multihop Relay Specification, IEEE P802.16j/D5, May 30, 2008, 317 pages.

Frediani et al., "Dynamic Resource Allocation in Relay Enhanced Cells based on WINNER System," In: Mobile and Wireless Communications Summit, 2007. 16th ISR, Jul. 1-5, 2007, pp. 1-5.

IEEE 802.16j-061013, Broadband Wireless Access Working Group, "Multi-hop Relay System Evaluation Methodology (Channel Model and Performance Metric)," Sep. 5, 2006, 38 pages.

International Preliminary Report on Patentability dated Apr. 2, 2009 for International Application No. PCT/US2007/078961, filed Sep. 19, 2007 (8 pages).

International Preliminary Report on Patentability dated Jan. 21, 2010 for International Application No. PCT/US2008/069377, filed Jul. 7, 2008 (6 pages).

International Search Report and Written Opinion dated Dec. 24, 2008 for PCT/US2008/069377, entitled: "Resource Allocation in Wireless Multi-Hop Relay Networks", 10 pages.

International Search Report and Written Opinion, dated Aug. 29, 2008, from international application PCT/US2007/078961, now WO 2008/036784, entitled "Frame Structure for Multi-Hop Relay in Wireless Communication Systems" (9 pages).

Izumikawa et al., "MAP Multiplexing in IEEE 802.16 Mobile Multi-Hop Relay," In: 17th Annual IEEE International Symposium on Personal, Indoor and Mobile Radio Communications (PIMRC'06), Sep. 2006, pp. 1-5.

Lin et al., "Resource scheduling with directional antennas for multi-hop relay networks in Manhattan-like environment," In: Mobile WiMAX Symposium, 2007. IEEE, Mar. 25-29, 2007, pp. 108-113.

Chen, J. et al., "A framework to relieve wireless hot-spot congestion by means of ad hoc connections," The Proceedings of the fifth IFIP-TC6 International Conference on Mobile and Wireless Communication Networks (MWCN '03), Singapore, Oct. 27-29, 2003, pp. 7-10.

English language abstract for Korean Patent No. KR 2006097693, published Sep. 14, 2006, entitled "Method for allocating transmission periods in wireless telecommunication system, capable of efficiently allocating transmission period in transmission frame period of wireless network system," (2 pages).

International Search Report and Written Opinion, dated Jul. 10, 2008, from international application PCT/US2008/054808, entitled "Signaling for Multi-Hop Relay in Wireless Communication Systems," (10 pages).

* cited by examiner

| Syntax | Size (bits) | Notes |
|---|---|---|
| Discarded_PDU_Report message format () { | | |
|   Management message type = 67 | 8 | |
|   Number of Connections | 8 | |
|   For (i=0; i< Number of Connections; i++) { | | |
|     Connection ID | 16 | Transport Connection ID or Basic CID |
|     Size of Discarded PDUs | 15 | In bytes. |
|     Measurement Frame Duration | 4 | In frames. |
|   } | | |
|   Reserved | 5 | |
| } | | |

| Name | Size | Discription |
|---|---|---|
| Size of Discarded PDU | 16 bits | The size of discarded PDUs in bytes |
| Connection ID | 16 bits | Connection identifier is addressed to discarded PDUs; or Basic CID of source station of discarded PDUs. |
| Measurement Frame Duration | 8 bits | The number of frames over which measurement is recorded |

FIG. 9

| Name | Size | Discription |
|---|---|---|
| Action Indication | 2 bits | 00: Report the information of discarded PDUs<br>01: Stop report the information of discarded PDUs from next frame<br>10~11: Reserved |
| Report Start Frame Offset | 8 bits | Indicate the frame from which report start. |
| Report Period | 4 bits | The period of report transmission in frames. If Report Period is set to zero, it means non-periodical report. |
| Report type | 2 bits | 00: Report based on connection<br>01: Report based on source station<br>10~11: Reserved |

SIGNALING FOR MULTI-HOP RELAY IN WIRELESS COMMUNICATION SYSTEMS

PRIORITY CLAIM AND RELATED APPLICATION

This application claims the benefit of U.S. Provisional Application No. 60/891,212 entitled "SIGNALING FOR MULTI-HOP RELAY IN WIRELESS COMMUNICATION SYSTEMS" and filed on Feb. 22, 2007, which is incorporated by reference as part of the specification of this application.

BACKGROUND

This application relates to wireless communication systems and techniques for wireless communications using one or more relay stations in addition to base stations.

Wireless communication systems use electromagnetic waves to communicate with fixed and mobile wireless communication devices, e.g., mobile wireless phones and laptop computers with wireless communication cards, that are located within cells of coverage areas of the systems. A radio spectral range or band designated or allocated for a wireless communication service or a particular class of wireless services may be divided into different radio carrier frequencies for generating different communication frequency channels. Such systems use base stations spatially distributed to provide radio coverage in a geographic service area which is divided into cells. In such a cellular deployment, each base station (BS) is conceptually located at the center of a respective cell to provide radio coverage for that cell and transmits information to a wireless subscriber station (SS) such as a mobile SS (MSS) via BS-generated downlink (DL) radio signals. A subscriber station at a particular cell transmits information to its serving base station for that particular cell via uplink (UL) radio signals. The base stations can include directional antennas to further divide each cell into different cell sectors where each antenna covers one sector. This sectorization of a cell increases the communication capacity.

The radio coverage of a network of fixed base stations may be limited due to various factors. Various structures may block the radio signals of certain base stations. For example, a tall building may shield a particular area from the radio signal from a base station, thus creating an undesired shadowing. At the edge of a radio cell, the signal strength can be weak and hence can increase the error rate in the wireless communications. One approach to mitigating these and other limitations is to increase the number of base stations in a given service area. In one implementation under this approach, one or more relay stations (RSs) can be deployed among certain fixed base stations to relay communication signals between a subscriber station and a base station, thus extending the coverage and improving the communication capacity and quality of the base station. A relay station may be a fixed transceiver or a mobile transceiver station depending on the specific conditions for deploying such as relay station. A subscriber station signals may hop through one or more RSs before reaching a serving base station. The proposed IEEE 802.16j provides Multi-hop Relay (MR) modes to use relay stations for enhanced coverage and service to subscribers. A multi-hop relay wireless network under IEEE 802.16j can include MR base stations (MR-BSs) with the support of the Multi-hop Relay modes.

SUMMARY

This application provides, among others, systems and techniques for signaling between a subordinate base station and a superordinate base station in a wireless network with wireless relay stations to inform the superordinate base station of a failure in establishing an uplink related to the subordinate base station and scheduling wireless resource allocation between a base station and one or more relay stations. In one implementation, a wireless communication system includes a plurality of base stations forming a base station network to provide wireless radio access for wireless communications and a plurality of relay stations. Each relay station is in wireless communication with at least one of the base stations and another relay station to extend a wireless coverage of the base station network. Each relay station establishes a link connection to a superordinate station, which is either a different relay station or a base station, to be connected to the base station network. This system includes a signaling mechanism that provides a timer to time a duration after a relay station fails to deliver an intended data packet to a superordinate station, and, after the timer expires, sends a failure report to the superordinate station to provide a description of the intended data package, the description comprising message size, Quality of Service (QoS), and message type of the intended data package.

In another implementation, a method for handling data control message streams among base stations and relay stations in a wireless communication network includes sending a bandwidth request for an uplink transmission from a subordinate station to a superordinate station among the base stations and relay stations; generating a failure report in the subordinate station when the subordinate station fails to receive an expected response message from the superordinate stations; and sending the failure report to the superordinate station in a next transmission opportunity according to a signaling policy.

In another implementation, a method for handling data control message streams among base stations, relay stations, and subscriber stations in a wireless communication network includes detecting a failure at a subordinate station in receiving a response message in a downlink transmission from a superordinate station to the subordinate station. The subordinate station is a first relay station and the superordinate station is either a base station or a second relay station which relays information between a base station and the first relay station. This method includes generating a failure report at the subordinate station; sending the failure report to the superordinate station in a next transmission opportunity according to a policy; and generating scheduling, at the superordinate station, for the subordinate station uplink transmission based on the received failure report from the subordinate station.

In yet another implementation, a method for handling data control message streams among base stations, relay stations, and subscriber stations in a wireless communication network includes initiating a timer after a relay station fails to establish a link connection to a superordinate station; operating the relay station to discard a message intended to be delivered to the superordinate base station after the timer expires; and sending a failure report from the relay station to the superordinate station to provide the discarded packet message description which comprises, message size, Quality of Service (QoS), and message type.

These and other implementations of systems and methods are described in greater detail in attached drawings, the detailed description and the claims.

BRIEF DESCRIPTION OF DRAWINGS

FIGS. 6, 7, 8A, 8B and 9 show examples of signal formats for the signaling processes.

DETAILED DESCRIPTION

For practical implementations, it is desirable that multi-hop Relay (MR) modes to be defined in IEEE 802.16j be backward compatible with the published IEEE 802.16-2004 and IEEE 802.16e-2005 standards. Hence, an existing mobile subscriber station (M-SS) can be used work with a relay station (RS) and a MR base station (MR-BS) without modification. Various types of relation stations (e.g., Fixed RS, Nomadic RS, and Mobile RS) and MR-BS are to be defined in the IEEE 802.16j project Task Group (TGj). One of purposes of the IEEE 802.16j Project Authorization Request (PAR) is to enhance coverage, throughput and system capacity of 802.16 networks by specifying 802.16 multi-hop relay capabilities and functionalities of interoperable relay stations and base stations.

Figure 1:
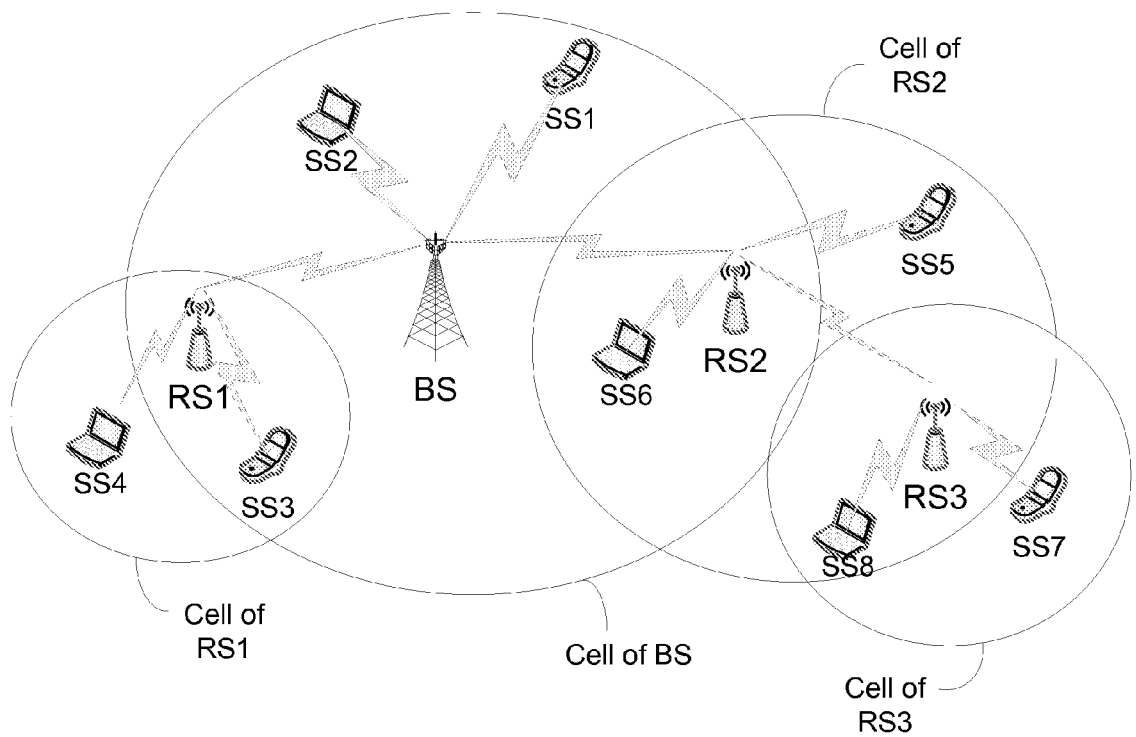
FIG. 1 shows an example of a wireless network system with base stations and relay stations.

FIG. 1 illustrates a portion of an exemplary wireless multi-hop relay communication system. This system includes multi-hop relay base stations (MR-BSs) and relay stations (e.g., RS1, RS2, and RS3) to provide radio coverage for serving one or more subscriber stations (e.g., SS1 to SS8). The base stations form a base station network to provide wireless radio access for wireless communications. Each relay station is in wireless communication with at least one of the base stations and another relay station to extend a wireless coverage of the base station network. Each relay station establishes a wireless link connection to a superordinate station, which is either a different relay station or a base station, to be connected to the base station network.

For example, the BS in FIG. 1 is shown to have three relay stations, RS1, RS2 and RS3 that expand the service coverage of the BS. The relay stations RS1, RS2 and RS3 are subordinate to the BS because the BS is connected to the network and is the gateway for the relations RS1, RS2 and RS3 to the rest of the network. Accordingly, the BS is the superordinate to the relay stations RS1, RS2 and RS3. In addition, it is possible for relay stations RS1, RS2 and RS3 under the control of the superordinate BS to have superordinate and subordinate relationships with one another. For example, the relay station RS3 is subordinate to the relay station RS2 because RS3 communicates to BS through RS2. Therefore, the relay station RS2 is the superordinate to the relay station RS3. In this context, BSs and relation stations in the system in FIG. 1 can be classified into superordinate base stations and subordinate base stations based on their relative relationships. Accordingly, the BS in FIG. 1 is the superordinate base station to all relay stations and the relay station RS2 is a subordinate base station to the BS but a superordinate base station to the relay station RS3. In FIG. 1, two subscriber stations SS3 and SS4 are shown to be in a coverage area of the RS1. Two subscriber stations SS5 and SS6 and one relay station RS3 are shown to be in a coverage area of RS2. The subscriber station s SS7 and SS8 are served by RS3.

A relay station (RS) is introduced between a MR base station (MR-BS) and one or more subscriber stations (SSs) (e.g., a mobile subscriber station) or one or more additional subordinate relay stations. Two different scheduling schemes can be used in IEEE 802.16j network system to provide communications between the MR base station and relay stations. One is centralized scheduling schemes, where a MR base station (MR-BS) makes fully centralized control of the resource over both the relay links and the access links. For example, a MR base station (MR-BS) allocates the bandwidth for all the relay stations (RSs) and the mobile stations (MSs) in its MR-cell. The other is distributed schemes, where a relay station (RS) can make fully or partially control of the resource over the links it controls. For example, each MR base station (MR-BS) and relay station (RS) can individually determine the bandwidth allocation on the links it controls.

In a distributed scheduling system, when the MAC protocol data units (PDUs) from a mobile subscriber station (MSS) need to be delivered to a MR base station (MR-BS) via one or more relay stations (RSs), the mobile subscriber station (MSS) can transmit the bandwidth request message to its associated relay station for uplink transmission bandwidth. After the bandwidth request is granted, the mobile subscriber station (MSS) transmits the MAC PDU's to its associated relay station (RS). The relay station (RS) can also request uplink bandwidth in order to forward the received MS MAC PDU's to MR base station (MR-BS) or its superordinate relay station (RS).

Sometimes, due to various reasons, the relay station (RS) fails to receive the expected uplink bandwidth allocation by MR base station (MR-BS) or superordinate relay station (RS) for the relay station (RS). In this case, the relay station (RS) can buffer the received MS MAC PDU's for a limited time and continue to request the uplink bandwidth. If the MR base station (MR-BS) or superordinate relay station (RS) still fails to allocate the uplink bandwidth for the relay station (RS) in order to relay the received MS MAC PDU's, or the buffer timer of relay station (RS) expires, the relay station (RS) can discard the received MS MAC PDU's.

A distributed scheduling system may not provide a desired uplink for a relay station in other situations. For example, a relay station (RS) requests the uplink bandwidth for transmission of its unsolicited management messages to MR base station (MR-BS) or its superordinate relay station (RS), but the bandwidth request is not granted. For another example, a relay station (RS) requests the uplink bandwidth for forwarding its received subordinate relay station (RS) management messages to the MR base station (MR-BS) or its superordinate relay station, but the bandwidth request is not granted.

The distributed scheduling scheme between MR base station (MR-BS) and relay stations (RSs) may result in a unbalanced resource allocation between MR base station (MR-BS) and relay stations (RSs). Such a unbalanced resource allocation can cause unexpected latency of packet transfer between mobile station (MS) and MR base station (MR-BS) via relay station (RS). Sometimes the packets are discarded by relay station (RS) and, therefore, the quality of service (QoS) of subscribers may degrade significantly.

This application describes, among others, systems and techniques for signaling between a subordinate base station and a superordinate base station to inform the superordinate base station of a failure in establishing an uplink related to the subordinate base station and scheduling wireless resource allocation between a base station (BS) and one or more relay stations (RSs). In one embodiment, the scheduling can be based on an implementation of the signaling scheme in this application and can be used to reduce the unexpected latency and discarding of packets transfer between MR base station (MR-BS) and relay station (RS). The scheduling can also be implemented based on one or more other factors such as the quality of the transmission links between the MR base station and the relay stations, the amount of the data and the type of data to be transferred by the relay stations, and the available bandwidth resource to support the data packets and/or management messages transmission in the MR base station cell coverage areas.

In one implementation, a relay station records the real-time information of discarded MAC PDU's. The recorded information indicates that the MAC PDU's are received successfully from its subordinate station(s) but not transmitted to its superordinate station by the relay station. The discarded MAC PDU's can also be the MAC PDU's of relay station itself for uplink transmission. Here, subordinate station may be a mobile station (MR) or subordinate relay station (RS). The superordinate station may be a superordinate relay station (RS) or MR base station (MR-BS).

In another implementation, the relay station can calculate the statistic information of discarded MAC PDU's over a time interval.

In another implementation, relay station records the real-time information of delayed MAC PDU's. These MAC PDU's are received successfully from a subordinate station, but are delayed in attempt to transmit them to a superordinate station by the relay station due to the uplink bandwidth grant is delayed. The delayed MAC PDU's can also be PDU's relay station's own MAC PDU's for uplink transmission. The delayed MAC PDU's can also be marked when the PDU's transmission delay exceed a given delay threshold.

In another implementation, the relay station can calculate the statistic information of delayed MAC PDU's over a time interval.

In another implementation, the information of the discarded MAC PDU's can include, but are not limited to, the size of discards MAC PDU's, the QoS level of discarded MAC PDU's, the source station identifier of discarded MAC PDU's, the connection identifier of MAC PDU's, the statistic time interval.

In another implementation, the information of the delayed MAC PDU's can include, but are not limited to, the delay time of delayed MAC PDU's, the size of delayed MAC PDU's, the QoS level of delayed MAC PDU's, the source station identifier of delayed MAC PDU's, the connection identifier of delayed MAC PDU's, the statistic time interval.

In another implementation, relay station sends an unsolicited report to superordinate station to provide the information of discarded MAC PDU's. Here a superordinate station can be MR base station or superordinate relay station. For example, relay station can send the real-time information report of discarded MAC PDU's to superordinate station at the next transmission opportunity whenever the event of discarding uplink MAC PDU's takes place in relay station. The report can be an aggregate information report or a statistic information report.

In another implementation, a relay station sends an unsolicited report to superordinate station to provide the information of delayed MAC PDU's. For example, relay station can send the real-time information report of delayed MAC PDU's to superordinate station along with the delayed MAC PDU's uplink transmission in an unsolicited manner. The report can be an aggregate information report or a statistic information report.

In another implementation, a relay station periodically reports the information of discarded MAC PDU's and/or delayed MAC PDU's to a superordinate station. The report period can be negotiated between the relay station and the superordinate station, or indicated by the superordinate station, or decided by the relay station itself.

In another implementation, a relay station reports the information of discarded MAC PDU's and/or delayed MAC PDU's to a superordinate station as indicated by superordinate station.

In another implementation, the reported information of discarded MAC PDU's by relay station can be the real-time information, aggregate information or statistic information of discarded MAC PDU's.

In another implementation, the reported information of delayed MAC PDU's by relay station can be the real-time information, aggregate information or statistic information of delayed MAC PDU's.

In another implementation, the statistic information of discarded MAC PDU's and/or delayed MAC PDU's can be made by relay station based on different criteria over a time interval. The criteria can include, but are not limited to the following criteria, per each source station, or per each connection, or per each link, or per QoS type of MAC PDU's.

In another implementation, the aggregate information of discarded MAC PDU's and/or delayed MAC PDU's can be made by relay station based on different criteria over a time interval. The criteria can include, but are not limited to the following criteria, per each source station, or per each connection, or per each link, or per QoS type of MAC PDU's.

In another implementation, a relay station can transmit the information of discarded MAC PDU's and/or delayed MAC PDU's on its appropriate available uplink bandwidth.

In another implementation, a relay station can transmit the information of discarded MAC PDU's and/or delayed MAC PDU's on the dedicated uplink bandwidth indicated by superordinate station.

In another implementation, a relay station can request the uplink bandwidth for transmission of the information of discarded MAC PDU's and/or delayed MAC PDU's to superordinate station.

In another implementation, the information format of discarded MAC PDU's and/or delayed MAC PDU's reported by relay station can be a stand-alone report message. The report message may be transmitted unsolicited by relay station. The report message may also be transmitted by relay station as a response to the report request of superordinate station. For example, the report message may be a management message or a MAC header.

In another implementation, the information format of discarded MAC PDU's and/or delayed MAC PDU's can be piggybacked on other MAC PDU's. For example, the report message format may be a MAC header or an extended report subheader.

In another implementation, a method for relay station to report the information of discarded MAC PDU's and/or delayed MAC PDU's is disclosed. The method includes that a relay station records the information of discarded MAC PDU's and/or delayed MAC PDU's. The relay station generates the appropriate information report of discarded MAC PDU's and/or delayed MAC PDU's based on the recorded information. The relay station sends the generated information report of discarded MAC PDU's and/or delayed MAC PDU's on appropriate uplink bandwidth.

In another implementation, a method for scheduling a relay station uplink MAC PDU's transmission is disclosed. The method includes that a superordinate station receives the information of discarded MAC PDU's and/or delayed MAC PDU's reported by relay station. The superordinate station adjusts the scheduling scheme for relay station uplink transmission based on the received information report and other possible scheduling factors.

In another implementation, a method for scheduling a relay station uplink MAC PDU's transmission is disclosed. The method includes that a superordinate station receives the information of discarded MAC PDU's and/or delayed MAC PDU's reported by relay station. The superordinate station generates the scheduling information for relay station uplink transmission based on the received information report and other possible scheduling factors. The superordinate station sends the scheduling information in downlink subframe to relay station. Here, the superordinate station can be a MR base station or a superordinate relay station.

Referring to FIG. 1, under the distributed scheduling scheme, BS controls the radio resource scheduling for uplink transmission and downlink transmission on the links between BS and its subordinate stations SS1, SS2, RS1, RS2. RS1 controls the radio resource scheduling for uplink and downlink transmission on the links between RS1 and SS3, SS4. RS2 controls the radio resource scheduling for uplink and downlink transmission on the links between RS2 and its subordinate stations SS5, SS6, RS3. Hence, RS2 allocates uplink bandwidth for RS3 to forward the received MAC PDU's of SS7 and/or SS8, or for RS3 to perform uplink transmission its management MAC PDU's. This allocation of uplink bandwidth by RS2 is independent of the scheduling of BS.

Figure 2:
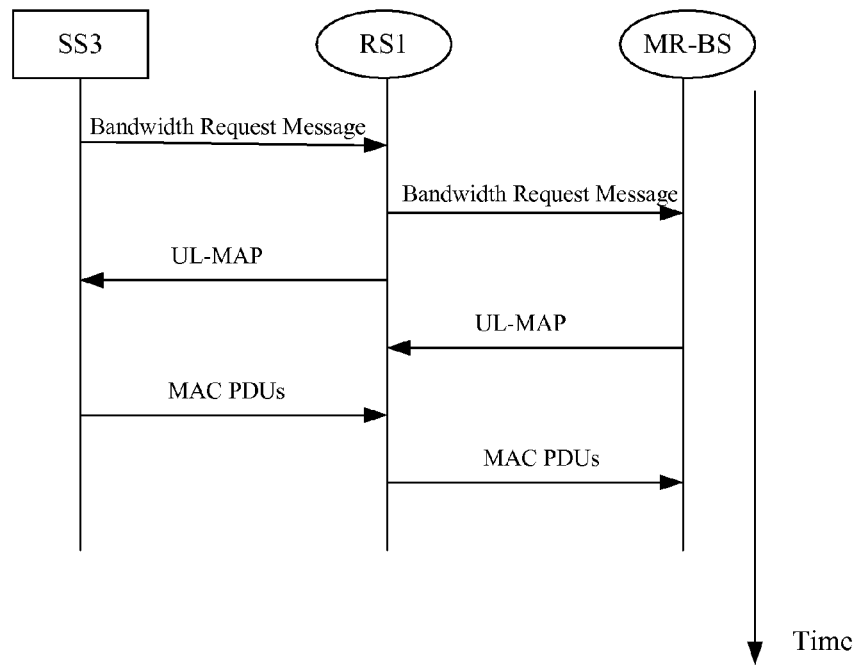
FIG. 2 shows an example flow diagram of success uplink transmissions under one implementation of a centralized scheduling scheme for base stations SS3, RS1 and MR-BS shown in FIG. 1.

FIG. 2 shows an example flow diagram of success uplink transmissions under one implementation of a centralized scheduling scheme for base stations SS3, RS1 and MR-BS shown in FIG. 1. The transmissions include SS and RS bandwidth request, RS and MR-BS bandwidth grant, and SS and RS MAC PDU's transmission. When SS3 has MAC PDU's to be transferred to MR-BS, SS3 first sends the uplink bandwidth request message to its associated superordinate relay station RS1. After RS1 receives the bandwidth request from SS3, RS1 individually allocates the radio resource over the access link between RS1 and SS3 for the SS3 uplink transmission and sends the scheduling information in its UL-MAP message. In order to forward the received SS3 MAC PDU's to MR-BS, RS1 obtains the uplink transmission grant from its superordinate station MR-BS. After MR-BS receives the bandwidth request from RS1, MR-BS allocates appropriate uplink resource for RS1 and sends the scheduling information to RS1 in its UL-MAP message. At this time, SS3 can transmit its MAC PDU's to RS1 on the uplink bandwidth allocated by RS1, then RS1 can transfer the received SS3 MAC PDU's to MR-BS on the uplink bandwidth allocated by MR-BS.

Figure 3A:
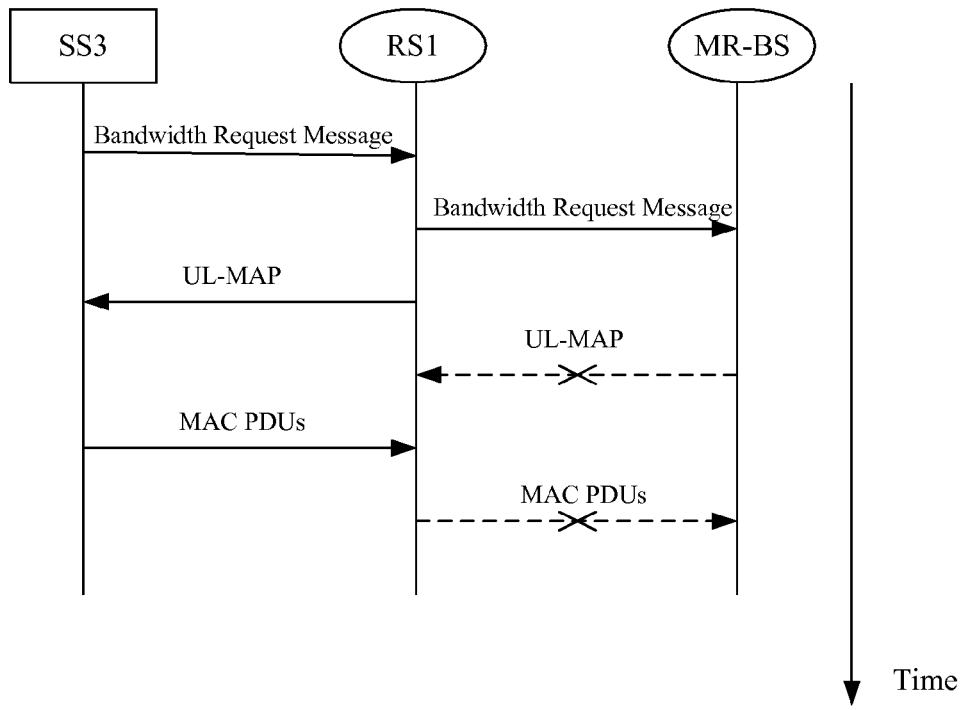
FIGS. 3A, 3B, 4, and 5 show examples of signaling processes in the system in FIG. 1.

FIG. 3A shows an example flow diagram of the centralized scheduling scheme in handling a failed uplink transmission, including SS and RS bandwidth request, RS bandwidth grant, SS MAC PDU's transmission. The relationship among SS3, RS1 and MR-BS is shown in FIG. 1. The process of SS and RS bandwidth requests, RS bandwidth grant, SS MAC PDU's transmission is performed similarly as shown by the example in FIG. 2. The difference between the process in FIG. 2 and the process in FIG. 3A lies in handling the failure of MR-BS bandwidth grant and RS MAC PDU's transmission denoted as the broken lines in FIG. 3A. In FIG. 3A, the RS1 bandwidth request is not granted by MR-BS and as such RS1 cannot transfer the received SS3 MAC PDU's to MR-BS. After the RS1 buffer timer expires or the number of RS1 retrying bandwidth request exceeds a preset threshold, RS1 discards the received SS3 MAC PDU's.

Figure 3B:
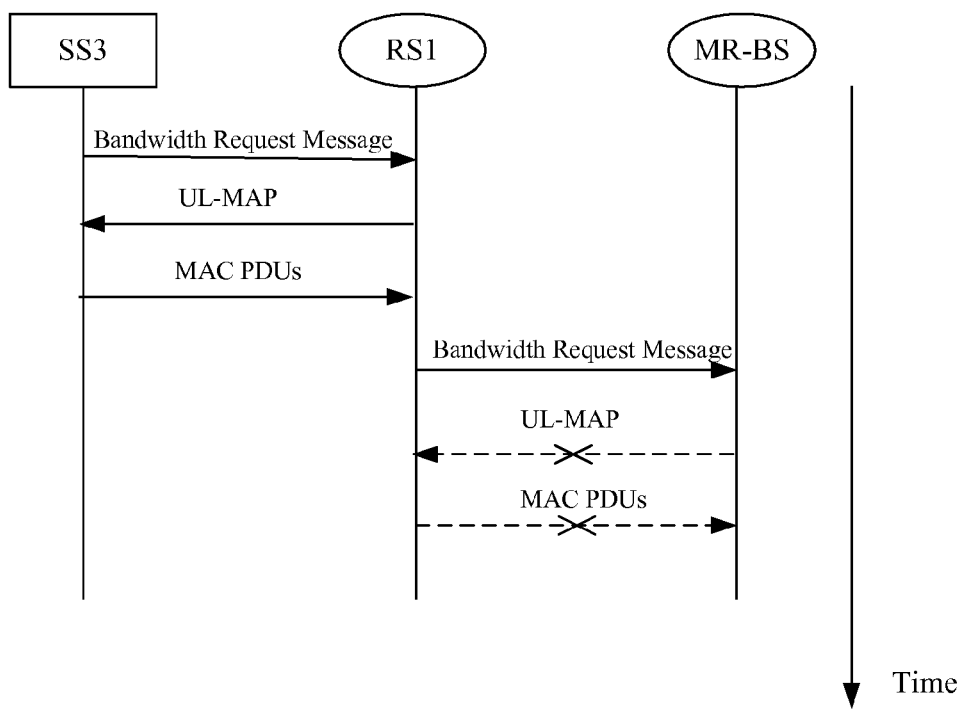

FIG. 3B shows an example flow diagram for handling a failed uplink transmission for a distributed scheduling scheme. Different from with the transmission sequence in the centralized scheduling scheme in FIG. 3A, the order of RS1 bandwidth request transmission in FIG. 3B is after the SS3 MAC PDU's are received. When the RS1 bandwidth request is not granted by MR-BS, the RS1 cannot transfer received SS3 MAC PDU's to MR-BS. After RS1 buffer timer expires or the number of RS1 retrying bandwidth request exceeds the threshold, RS1 discards the received SS3 MAC PDU's.

Figure 4:
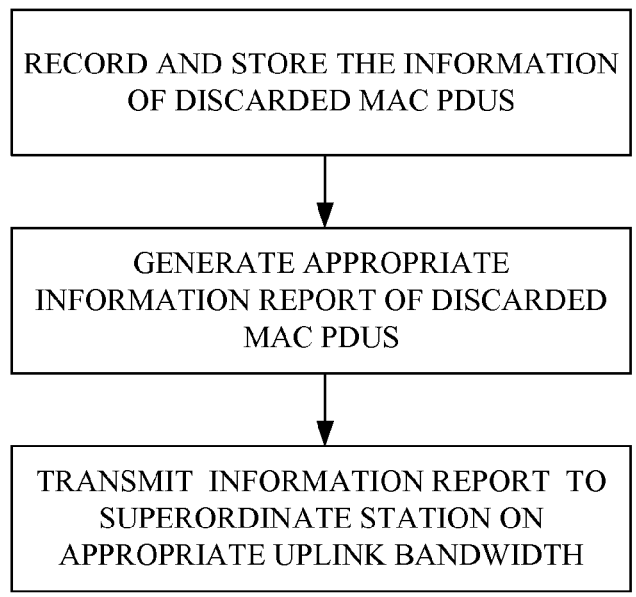

FIG. 4 shows an example flow diagram of a RS (or a subordinate base station) reporting the information of discarded MAC PDU's to a superordinate base station. First, RS records and stores the information of discarded MAC PDU's which should be transferred to superordinate station before MAC PDU's are discarded. The information of discarded MAC PDU's includes, but is not limited to, the size of discarded MAC PDU's, the source station identifier of discarded MAC PDU's, the quality of service (QoS) level of discarded MAC PDU's, and the connection identifier of discarded MAC PDU's. Second, RS generates appropriate information report of discarded MAC PDU's unsolicited or per the indication of superordinate station. The information report can include the real-time information of discarded MAC PDU's, aggregate information or statistical information of discarded MAC PDU's over a time interval. The information report can be a management message, a MAC header, or a MAC extended subheader. Third, RS transmits the generated information report to superordinate station on appropriate uplink bandwidth. RS can transmit the generated information report unsolicited or as a response of superordinate station. RS can transmit the generated information report periodically as indicated by superordinate station. The generated information report can be transmitted as a stand-alone MAC message or piggybacked on a MAC PDU. The above flow diagram for the RS report information of discarded MAC PDU's can also be used to report the information of delayed MAC PDU's.

Figure 5:
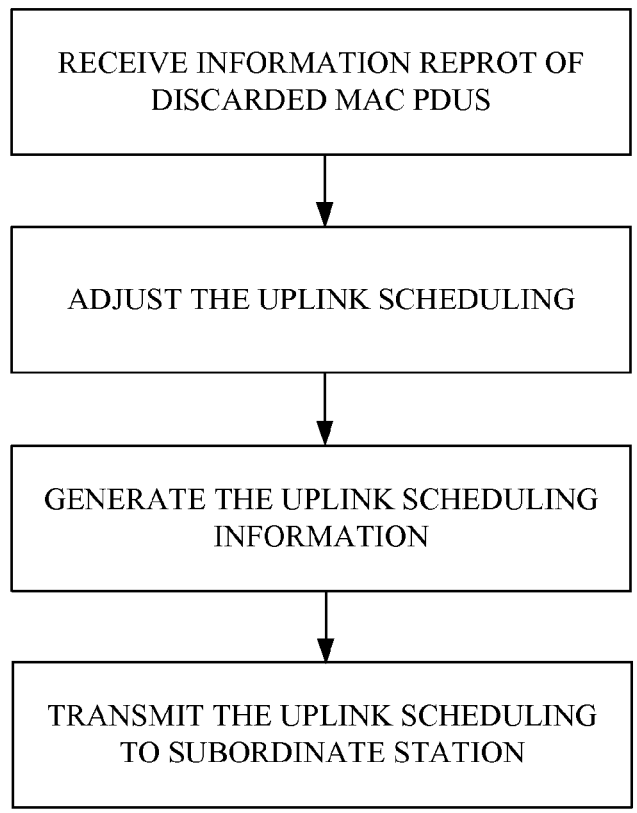

FIG. 5 shows an example flow diagram of a superordinate station uplink scheduling when sending data from the superoridinate base station to a respective subordinate base station. In this situation, the superordinate station can be an MR base station or superordinate relay station. First, the superordinate station receives the information report of discarded MAC PDU's. Second, the superordinate station adjusts the radio resource for uplink transmission based on the received information report and other possible factors. Third, the superordinate station generates appropriate the uplink scheduling information. Next, the superordinate station transmits the generated uplink scheduling information to subordinate relay station.

Figures 6, 7:
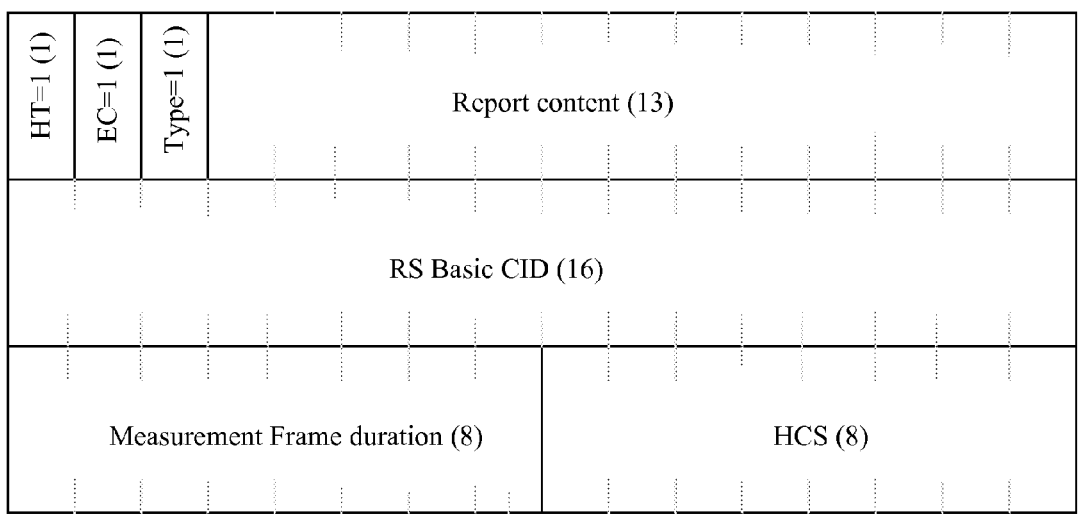

FIG. 6 shows an example format of the report message of discarded MAC PDU's information. The information report of discarded MAC PDU's can be implemented as a stand-alone MAC message.

FIG. 7 shows another example format of the information report of discarded MAC PDU's. The information report of discarded MAC PDU's is a MAC header. A MAC signaling header is transmitted by relay station to report the information of discarded MAC PDU's. Based on MAC signaling header type II defined in IEEE 802.16e standard, the following fields already exist, HT=1, EC=1, Type=1, and 8 bits HCS. A MAC signaling header also contains RS Basic CID ("initial connection identifier"), report content, report type. The RS Basic CID is assigned to the relay station which reports the information of its discarded MAC PDU's. The field of Report Content indicates the number of discarded MAC PDU's in bytes. The fields of Measurement Frame Duration indicates the number of frames where the number of discarded MAC PDU's is measured.

Figures 8A, 8B:
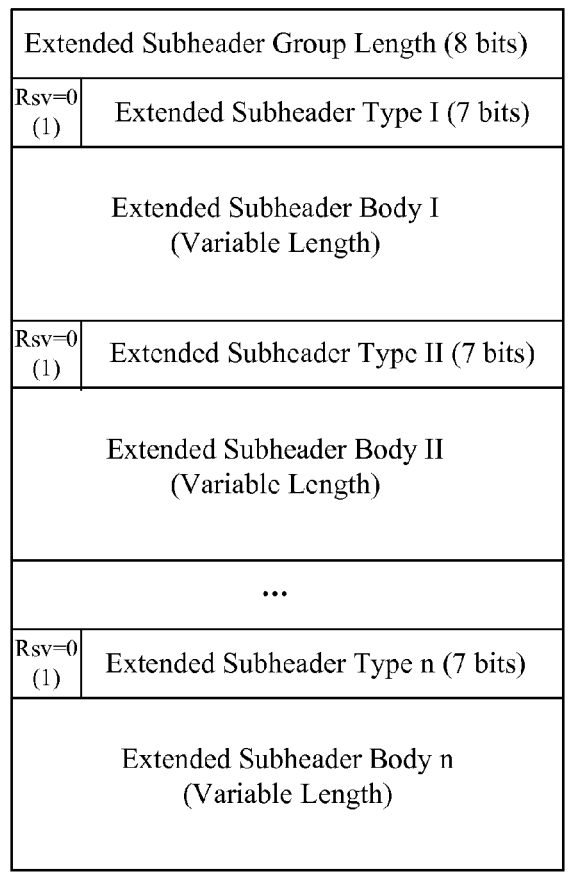

FIG. 8A and FIG. 8B show another example format of the information report of discarded MAC PDU's. In FIG. 8A, the information report of discarded MAC PDU is a MAC extended subheader. The extended subheader group format is already defined in IEEE 802.16e standard as illustrated in FIG. 8A. Discarded PDU report extended subheader is an uplink extended subheader transmitted to superordinate station. The type of discarded PDU report extended subheader can be one of 5-127. Discarded PDU report extended subheader format is illustrated as FIG. 8B. The field of Connection ID indicates the connection discarded PDU's belong to.

FIG. 9 shows an example format of the information request of discarded MAC PDU's. The information request of discarded MAC PDU's is MAC extended subheader. The extended subheader group format is already defined in IEEE 802.16e standard. Discarded PDU request extended subheader format is a downlink extended subheader. The discarded PDU request extended subheader is transmitted to request subordinate relay station report the information of discarded PDU's. The following fields can be included in discarded PDU request extended subheader: Action Indication, Report Start Frame Offset, Report Period, and Report Type.

The above mentioned flow diagrams and information format types for discarded MAC PDU's can also be used for delayed MAC PDU's.

The implementations can be used to allow for multi-hop relay wireless communications among base stations, relay stations, and subscriber stations. Subscriber stations can include but are not limited to fixed, nomadic, and mobile stations. Relay stations can include but are not limited to fixed, nomadic, and mobile relay stations. The described techniques may be implemented on a dedicated wireless infrastructure or may be implemented as networks expansion on top of existing wireless communications systems.

Referring back to FIG. 1, after a superordinate station (e.g., the BS or the RS2 with respect to RS3) receives the failure report message from a subordinate station on a previous failure in an uplink transmission from the superordinate station to the subordinate station, the superordinate station can be controlled to modify a property of the uplink from the subordinate station to the superordinate station to increase the reliability of the uplink transmission. For example, the signal coding modulation on the uplink may be changed to a lower bit modulation (e.g., from a 64-QAM modulation to a 16-QAM modulation) to allocate more resource to the uplink and to improve the reliability of the uplink. As another example, the QoS level of the uplink may be increased in response to the failure report.

While this specification contains many specifics, these should not be construed as limitations on the scope of any invention or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Thus, particular embodiments have been described. Other embodiments are within the scope of the following claims.

What is claimed is:

1. A method for handling data control message streams among base stations and relay stations in a wireless communication network, comprising:
   receiving, at a subordinate station, a MAC protocol data unit (MAC PDU) from a mobile subscriber station (MS);
   sending a bandwidth request for an uplink transmission of the received MAC PDU from the subordinate station to a superordinate station among the base stations and relay stations;
   generating a failure report comprising information of at least one of a discarded MAC protocol data unit (PDU) and a delayed MAC PDU in the subordinate station when the subordinate station fails to receive an expected bandwidth allocation message, in response to the bandwidth request, from the superordinate stations; and
   sending the failure report to the superordinate station in a next transmission opportunity according to a signaling policy.

2. The method as claimed in claim 1, comprising:
   sending the failure report to the superordinate station after a buffer timer of the subordinate station expires.

3. The method as claimed in claim 1, comprising:
   sending the failure report to the superordinate station by the subordinate station in an unsolicited manner.

4. The method as claimed in claim 1, comprising:
   sending the failure reports to the superordinate station upon receiving a request from the superordinate station to the subordinate station.

5. The method as claimed in claim 1, comprising:
   sending the failure report to the superordinate station periodically.

6. The method as claimed in claim 5, wherein:
   a report period for periodically sending the failure report is a period negotiated between the subordinate station and the superordinate station.

7. The method as claimed in claim 5, wherein:
   a report period for periodically sending the failure report is indicated by the superordinate station.

8. The method as claimed in claim 5, wherein:
   a report period for periodically sending the failure report is determined by the subordinate station.

9. The method as in claim 1, wherein:
   the subordinate station is a relay station and the superordinate station is a multi-hop base station.

10. The method as in claim 1, wherein:
    the subordinate station is a first relay station and the superordinate station is a second relay station which relays information between a base station and the first relay station.

11. The method as in claim 1, wherein:
    sending the failure report to the superordinate station on a dedicated uplink bandwidth indicated by the superordinate station.

12. The method as in claim 1, wherein:
    sending the failure report to the superordinate station as a stand-alone message.

13. The method as in claim 1, wherein:
    sending the failure report to the superordinate station in a piggyback format.

14. A method for handling data control message streams among base stations, relay stations, and subscriber stations in a wireless communication network, comprising:
    receiving, at a subordinate station, a MAC protocol data unit (MAC PDU) from a mobile subscriber station (MS);
    detecting a failure at the subordinate station in receiving a bandwidth allocation response message in a downlink transmission from a superordinate station to the subordinate station, wherein the subordinate station is a first relay station and the superordinate station is either a base station or a second relay station which relays information between a base station and the first relay station;
    generating a failure report comprising information of at least one of a discarded MAC protocol data unit (PDU) and a delayed MAC PDU at the subordinate station;

sending the failure report to the superordinate station in a next transmission opportunity according to a policy;

generating scheduling, at the superordinate station, for the subordinate station uplink transmission based on the received failure report from the subordinate station.

15. The method in claim 14, comprising:
re-adjusting the existing scheduling, at the superordinate station, for the subordinate station uplink transmission.

16. The method as in claim 14, comprising:
attaching the failure report as a message to another uplink message in a piggyback format in sending the failure report by the subordinate station.

17. The method as claimed in claim 14, wherein:
the failure report is sent in response to a report request by the superordinate station.

18. The method as in claim 14, wherein:
the failure report is sent through a dedicated uplink channel (or bandwidth) indicated by the superordinate station.

19. A method for handling data control message streams among base stations, relay stations, and subscriber stations in a wireless communication network, comprising:
initiating a timer after a relay station fails to establish a link connection to a superordinate station;
operating the relay station to discard a message intended to be delivered to the superordinate base station after the timer expires; and
sending a failure report comprising information of at least one of a discarded MAC protocol data unit (PDU) and a delayed MAC PDU from the relay station to the superordinate station to provide the discarded packet message description which comprises, message size, Quality of Service (QoS), and message type.

20. The method as claimed in claim 19, wherein:
the failure report includes error information that comprises statistic information of discarded messages over time.

21. A wireless communication system, comprising:
a plurality of base stations forming a base station network to provide wireless radio access for wireless communications;
a plurality of relay stations, each relay station being in wireless communication with at least one of the base stations and another relay station to extend a wireless coverage of the base station network, each relay station establishing a link connection to a superordinate station, which is either a different relay station or a base station, to be connected to the base station network;
a signaling mechanism that provides a timer to time a duration after a relay station fails to deliver an intended data packet to a superordinate station, and, after the timer expires, sends a failure report comprising information of at least one of a discarded MAC protocol data unit (PDU) and a delayed MAC PDU to the superordinate station to provide a description of the intended data packet, the description comprising message size, Quality of Service (QoS), and message type of the intended data packet.

22. The system as claimed in claim 21, wherein:
the signaling mechanism sends a description from the relay station to the superordinate base station that comprises statistic information of intended messages over time.

23. The system as claimed in claim 21, wherein:
the signaling mechanism sends a description from the relay station to the superordinate base station that indicates excessive delay of messages to be relayed.

24. An apparatus for handling data control message streams among base stations and relay stations in a wireless communication network, comprising:
means for receiving, at a subordinate station, a MAC protocol data unit (MAC PDU) from a mobile subscriber station (MS);
means for sending a bandwidth request for an uplink transmission of the received MAC PDU from the subordinate station to a superordinate station among the base stations and relay stations;
means for generating a failure report comprising information of at least one of a discarded MAC protocol data unit (PDU) and a delayed MAC PDU in the subordinate station when the subordinate station fails to receive an expected bandwidth allocation message, in response to the bandwidth request, from the superordinate stations; and
means for sending the failure report to the superordinate station in a next transmission opportunity according to a signaling policy.

25. The apparatus as claimed in claim 24, comprising:
means for sending the failure report to the superordinate station after a buffer timer of the subordinate station expires.

26. The apparatus as claimed in claim 24, comprising:
means for sending the failure report to the superordinate station by the subordinate station in an unsolicited manner.

27. The apparatus as claimed in claim 24, comprising:
means for sending the failure reports to the superordinate station upon receiving a request from the superordinate station to the subordinate station.

28. The apparatus as claimed in claim 24, comprising:
means for sending the failure report to the superordinate station periodically.

29. The apparatus as claimed in claim 28, wherein:
a report period for periodically sending the failure report is a period negotiated between the subordinate station and the superordinate station.

30. The apparatus as claimed in claim 28, wherein:
a report period for periodically sending the failure report is indicated by the superordinate station.

31. The apparatus as claimed in claim 28, wherein:
a report period for periodically sending the failure report is determined by the subordinate station.

32. The apparatus as in claim 24, wherein:
the subordinate station is a relay station and the superordinate station is a multi-hop base station.

33. The apparatus as in claim 24, wherein:
the subordinate station is a first relay station and the superordinate station is a second relay station which relays information between a base station and the first relay station.

34. The apparatus as in claim 24, wherein:
means for sending the failure report to the superordinate station on a dedicated uplink bandwidth indicated by the superordinate station.

35. The apparatus as in claim 24, wherein: means for sending the failure report to the superordinate station as a stand-alone message.

36. The apparatus as in claim 24, wherein: means for sending the failure report to the superordinate station in a piggyback format.

* * * * *